United States Patent
Jeong et al.

(10) Patent No.: US 11,978,232 B2
(45) Date of Patent: May 7, 2024

(54) METHOD FOR DISPLAYING THREE-DIMENSIONAL AUGMENTED REALITY

(71) Applicant: NAVER LABS CORPORATION, Seongnam-si (KR)

(72) Inventors: Yeong Ho Jeong, Seongnam-si (KR); Dong Cheol Hur, Seongnam-si (KR); Sang Wook Kim, Seongnam-si (KR)

(73) Assignee: NAVER LABS CORPORATION, Seongnam-si (KR)

( * ) Notice: Subject to any disclaimer, the term of this patent is extended or adjusted under 35 U.S.C. 154(b) by 79 days.

(21) Appl. No.: 17/656,776

(22) Filed: Mar. 28, 2022

(65) Prior Publication Data

US 2022/0215581 A1 Jul. 7, 2022

Related U.S. Application Data

(63) Continuation of application No. PCT/KR2020/014837, filed on Oct. 28, 2020.

(30) Foreign Application Priority Data

Oct. 28, 2019 (KR) .................. 10-2019-0134793

(51) Int. Cl.
*G06T 7/73* (2017.01)
*G06T 19/00* (2011.01)
*G06T 19/20* (2011.01)

(52) U.S. Cl.
CPC .............. *G06T 7/74* (2017.01); *G06T 19/006* (2013.01); *G06T 19/20* (2013.01); *G06T 2219/2004* (2013.01); *G06T 2219/2016* (2013.01)

(58) Field of Classification Search
CPC .......... G06T 19/20; G06T 19/006; G06T 7/74; G06T 7/246; G06T 2219/2004;
(Continued)

(56) References Cited

U.S. PATENT DOCUMENTS

| 8,824,736 B2 | 9/2014 | Lefevre et al. |
| 9,508,146 B2 | 11/2016 | Davies et al. |

(Continued)

FOREIGN PATENT DOCUMENTS

| KR | 101328759 B1 | 11/2013 |
| KR | 1020140055975 A | 5/2014 |

(Continued)

OTHER PUBLICATIONS

ISR issued in PCT/KR2020/014837, mailed Jan. 22, 2021.

*Primary Examiner* — Yaron Cohen
(74) *Attorney, Agent, or Firm* — Greer Burns & Crain Ltd.

(57) ABSTRACT

A method of displaying 3-dimensional (3D) augmented reality includes transmitting a first image generated by photographing a target object at a first time point, and storing first view data at the first time point; receiving first relative pose data of the target object; estimating pose data of the target object, based on the first view data and the first relative pose data of the target object; generating a second image by photographing the target object at a second time point, and generating second view data at the second time point; estimating second relative pose data of the target object, based on the pose data of the target object and the second view data; rendering a 3D image of a virtual object, based on the second relative pose data of the target object; and generating an augmented image by augmenting the 3D image of the virtual object on the second image.

17 Claims, 7 Drawing Sheets

(58) Field of Classification Search
CPC .. G06T 2207/30244; G06T 2219/2016; H04N 13/194
See application file for complete search history.

(56) References Cited

U.S. PATENT DOCUMENTS

| | | | |
|---|---|---|---|
| 10,013,805 | B2 | 7/2018 | Barzuza et al. |
| 11,221,213 | B2 | 1/2022 | Abovitz et al. |
| 2017/0322715 | A1* | 11/2017 | Cohrt ................. G06F 3/04817 |

FOREIGN PATENT DOCUMENTS

| | | |
|---|---|---|
| KR | 1020150099401 A | 8/2015 |
| KR | 1020160088208 A | 7/2016 |
| KR | 1020180004568 A | 1/2018 |
| KR | 1020180104051 A | 9/2018 |

* cited by examiner

METHOD FOR DISPLAYING THREE-DIMENSIONAL AUGMENTED REALITY

CROSS-REFERENCE TO RELATED APPLICATION

This is a continuation application of International Application No. PCT/KR2020/014837, filed Oct. 28, 2020, which claims the benefit of Korean Patent Application No. 10-2019-0134793, filed Oct. 28, 2019.

BACKGROUND OF THE INVENTION

Field of Invention

The present disclosure relates to a method and program for displaying 3-dimensional (3D) augmented reality, and more particularly, to an apparatus, method, and program for generating an augmented image by augmenting, on a target object, a 3D virtual object having the same pose as the target object, and displaying the augmented image.

Description of Related Art

Augmented reality is one field of virtual reality, and is a computer graphic technique in which a virtual object is combined with an actual or real-world environment such that the virtual object looks like an object present in an original environment.

The augmented reality adds the virtual object to the actual environment currently seen by a user, and thus the user may see the actual environment and the virtual object together. Generally, the virtual object is quite different from the actual environment, and thus is used to provide information or to provide fun, such as a sticker, pasted on a photograph.

The user may have a sense of space with respect to an image displayed on a 2-dimensional (2D) display device by using perspective. However, the virtual object added in augmented reality is displayed in two dimensions, and thus, the user feels that the virtual object does not belong in an actual environment.

In this regard, there has been an attempt to add a 3-dimensional (3D) virtual object an actual environment. However, in an actual environment, a 3D object is viewed differently by the user according to a change in the eyeline of the user, but it is difficult to display the 3D virtual object added in augmented reality to naturally change immediately in response to the change in the eyeline of the user. The user still feels that the 3D virtual object does not belong in the actual environment.

BRIEF SUMMARY OF THE INVENTION

The present disclosure is directed to providing a method and program for augmenting, on a target object in an actual environment, a 3-dimensional (3D) virtual object having the same pose as the target object, and displaying the 3D virtual object, such that the 3D virtual object is more naturally harmonized in the actual environment.

According to a first aspect of the present disclosure, a method, performed by a computing device communicating with a server, of displaying 3-dimensional (3D) augmented reality includes: transmitting, to the server, a first image generated by photographing a target object by using a camera at a first time point, and storing first view data of the camera at the first time point; receiving, from the server, first relative pose data of the target object; estimating pose data of the target object, based on the first view data of the camera and the first relative pose data of the target object; generating a second image by photographing the target object by using the camera at a second time point, and generating second view data of the camera at the second time point; estimating second relative pose data of the target object, based on the pose data of the target object and the second view data of the camera; rendering a 3D image of a virtual object, based on the second relative pose data of the target object; and generating an augmented image by augmenting the 3D image of the virtual object on the second image.

According to a second aspect of the present disclosure, provided is a computer program stored in a medium to execute a method of displaying 3-dimensional (3D) augmented reality, by using a computing device.

According to various embodiments of the present disclosure, by augmenting, on a target object in an actual environment, a 3-dimensional (3D) virtual object having the same pose as the target object and displaying the 3D virtual object to a user, the user may feel less foreign to the 3D virtual object added in augmented reality.

DETAILED DESCRIPTION OF THE INVENTION

Hereinafter, various embodiments will be described in detail with reference to the accompanying drawings such that one of ordinary skill in the art may easily implement the present disclosure. However, the technical idea of the present disclosure may be implemented by being modified in various forms, and thus is not limited to embodiments described in the present specification. While describing embodiments of the present specification, detailed descriptions about a related well-known technology are omitted when it is determined that describing the well-known technology in detail may blur the gist of the technical idea of the present disclosure. Same reference numerals are assigned to the same or similar elements, and redundant descriptions thereof are omitted.

When it is described that an element is "connected" to another element in the present specification, the element may not only be "directly connected" to the other element, but may also be "indirectly connected" to the other element with another element in between. When an element "includes" another element, the element may further include another element instead of excluding the other element, unless otherwise stated.

Some embodiments may be described by functional block configurations and various processing operations. Some or all of these functional blocks may be implemented by various numbers of hardware and/or software configurations that perform particular functions. For example, the functional blocks of the present disclosure may be implemented by one or more microprocessors or by circuit configurations for a certain function. The functional blocks of the present disclosure may be implemented in various programming or scripting languages. The functional blocks of the present disclosure may be implemented by algorithms executed in one or more processors. A function performed by a functional block of the present disclosure may be performed by a plurality of functional blocks, or functions performed by a plurality of functional blocks of the present disclosure may be performed by one functional block. In addition, the present disclosure may employ general techniques for electronic environment setting, signal processing, and/or data processing.

Figure 1:
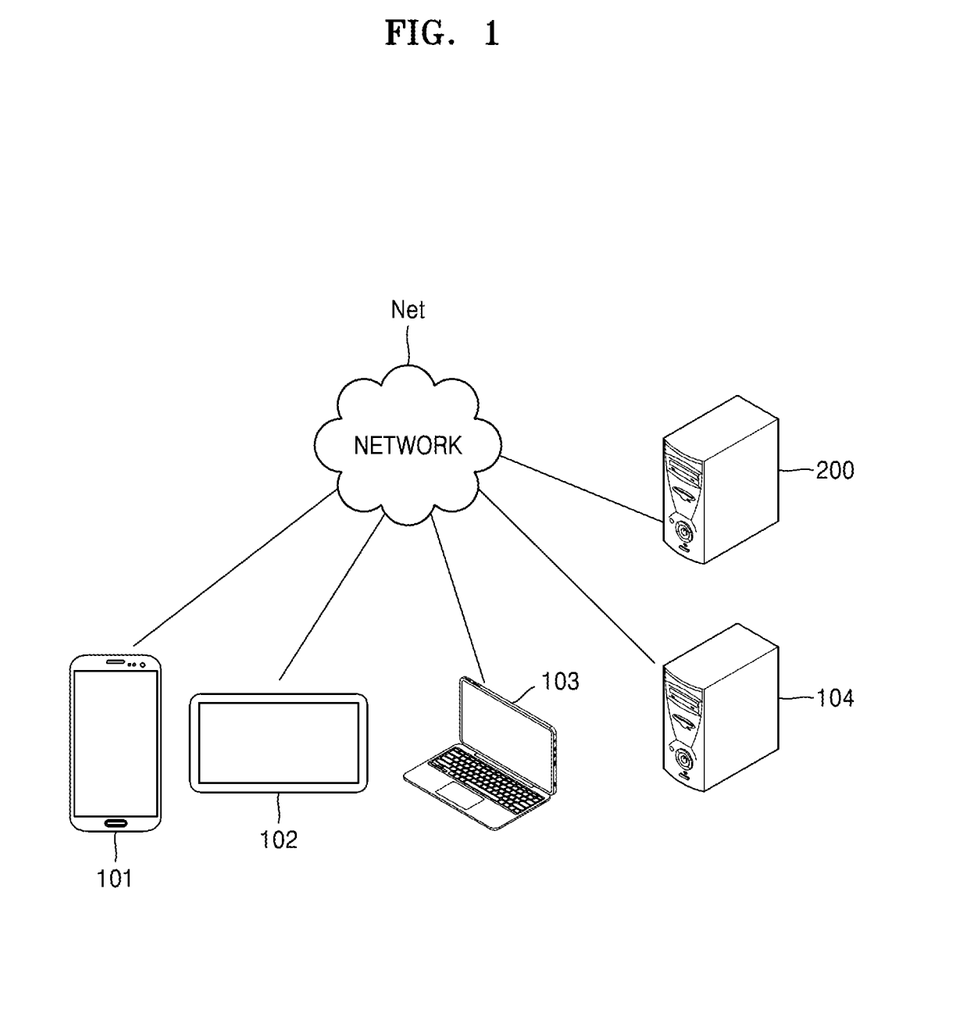
FIG. 1 illustrates a configuration of a system for displaying 3-dimensional (3D) augmented reality, according to an embodiment.

FIG. 1 illustrates a configuration of a system for displaying 3-dimensional (3D) augmented reality, according to an embodiment.

Referring to FIG. 1, the system for displaying 3D augmented reality includes terminals 101 to 104, a server 200, and a network Net connecting the terminals 101 to 104 and the server 200 to each other.

The system for displaying 3D augmented reality, according to an embodiment, may generate and display an augmented image by adding, on an image obtained by capturing a target object, a 3D image of a virtual object rendered to have the same pose as the target object.

In the present specification, the target object is an object photographed by a camera, and the virtual object is a 3D image to be added on the target object of the image captured by the camera. A pose is a concept including a position and orientation of an object. A pose of the target object may be understood as representing a position and orientation of the target object in a real-world coordinate system and a relative pose of the target object may be understood as representing the position and orientation of the target object in a camera coordinate system. A pose of the camera may be understood as representing a position and orientation of the camera in the real-world coordinate system.

The real-world coordinate system may be an absolute coordinate system such as a geocentric coordinate system. The camera coordinate system is a coordinate system defined by the pose of the camera, wherein the camera is positioned at an origin of the camera coordinate system and x, y, and z axes of the camera coordinate system are defined according to a direction in which the camera is directed. For easy understanding of the present disclosure, an object coordinate system may be used. The object coordinate system is a coordinate system defined by the pose of the target object, wherein the target object is positioned in an origin of the object coordinate system and x, y, and z axes of the object coordinate system may be defined by a direction defined by a user with respect to the target object.

Figure 2:
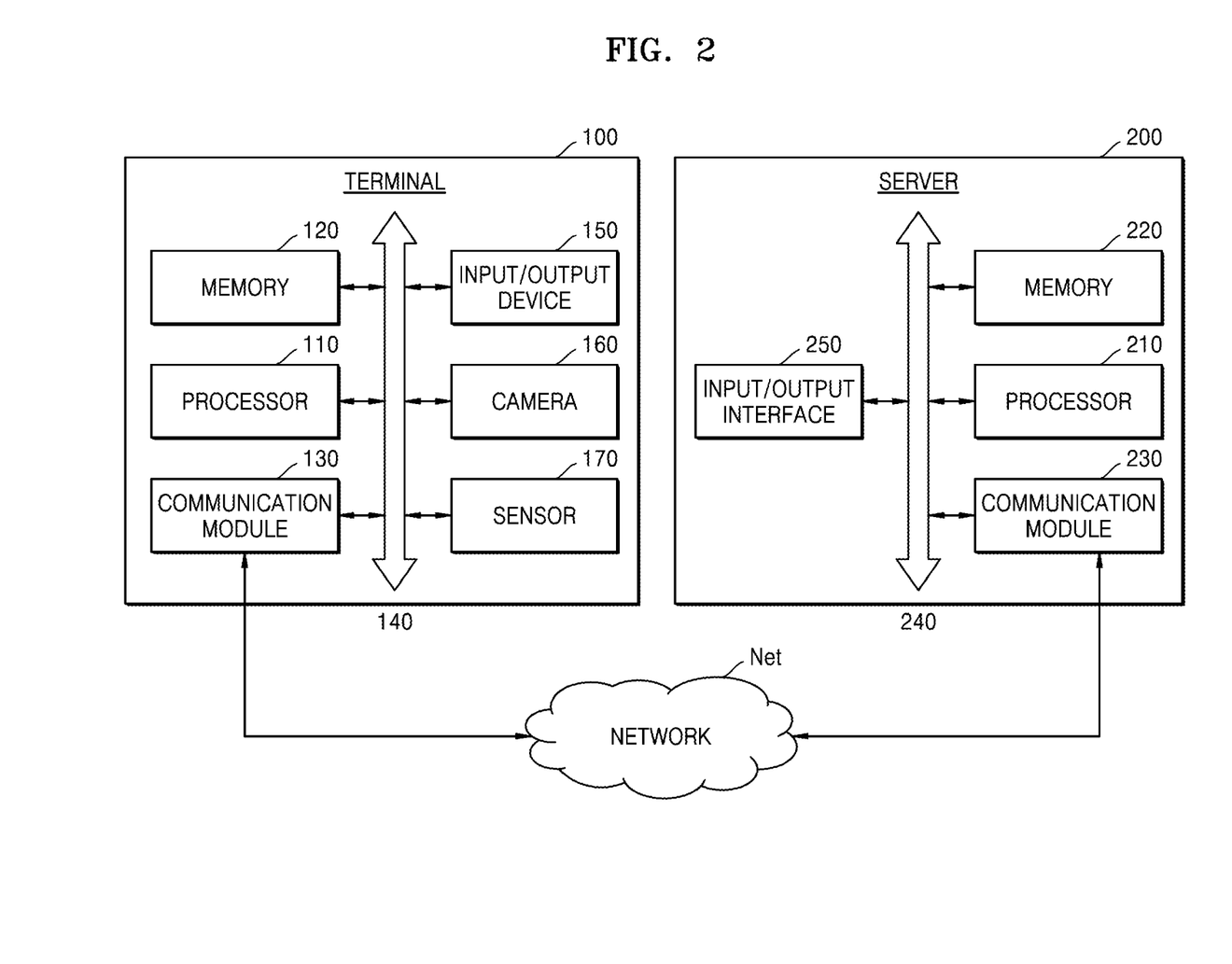
FIG. 2 illustrates internal configurations of a terminal and server, according to an embodiment.

The terminals 101 to 104 are user terminals performing a computing function and may be referred to as a terminal 100 of FIG. 2. The terminal 100 may include, for example, a smart phone 101, a table personal computer (PC) 102, a laptop computer 103, and a PC 104. According to an embodiment, the terminal 100 may include a camera, a wireless communication module, and an input/output device like the smart phone 101, the table PC 102, and the laptop computer 103. According to another embodiment, the terminal 100 may not directly include a camera but may be connected to a camera (not shown) via communication, such as the PC 104. The PC 104 may receive an image captured by the camera and information about the camera via the network Net. According to another embodiment, the terminal 100 may be the PC 104 including the camera.

Hereinbelow, it is assumed that the terminal 100 directly includes the camera, such as the smart phone 101. However, according to another embodiment of the present disclosure, the terminal 100 may not directly include the camera and may exchange data with the camera in real time via communication.

The terminal 100 may communicate with the server 200 by accessing the network Net via wired communication and/or wireless communication. The terminal 100 may transmit, to the server 200, the image of the target object, which is captured via the camera, and receive, from the server 200, relative pose data of the target object in the transmitted image.

The network Net may communicably connect the terminal 100 and the server 200. For example, the network Net provides an access path for the terminal 100 to access the server 200, thereby transmitting image and receiving the relative pose data. The network Net may provide a path for the terminal 100 to receive, from the camera, the image data and view data of the camera.

The network Net may include a wired network and/or a wireless network. For example, the network Net may include various networks, such as a local area network (LAN), a metropolitan area network (MAN), and a wide area network (WAN). The network Net may include World Wide Web (WWW). However, the network Net according to the current embodiment is not limited thereto, and may include at least one of a known mobile communication network, a known wireless data network, a known phone network, and a known wired/wireless television network. The network Net may include one or more of network topologies including a bus network, a start network, a ring network, a mesh network, a star-bus network, and a tree or hierarchical network.

The server 200 may be implemented as one or more computing devices providing a command, a code, a file, content, and a service while communicating with the terminal 100 via the network Net. The server 200 may receive, from the terminal 100, the image obtained by capturing the target object, and extract, from the received image, the class, position, and pose of the target object by using a pre-trained learning model. The server 200 may provide, to the terminal 100, at least one of the extracted relative pose data, position data, and class data of the target object via the network Net.

The terminal 100 may render the 3D image of the virtual object having the same pose as the target object, based on the relative pose data of the target object. The terminal 100 may include a rendering model for performing 3D rendering on the virtual object. The rendering model may include a plurality of pieces of base data for rendering a plurality of virtual objects. The user may select a virtual object to be augmented on an augmented image from among a plurality of virtual objects.

The server 200 may store an installation file for installing the rendering model in the terminal 100, and the terminal 100 may receive the installation file from the server 200 and execute the installation file such that the rendering model is installed in the terminal 100. The rendering model may be installed in the terminal 100 via another method.

The terminal 100 may generate the image data of the target object and the relative pose data of the target object for training the learning model of the server 200, and provide the same to the server 200. The server 200 may train the learning model by using the image data and relative pose data of the target object received from the terminal 100. The terminal 100 may generate about tens to hundreds of pieces of image data for one target object and relative pose data at this time, and provide the same to the server 200.

FIG. 2 illustrates internal configurations of a terminal and a server, according to an embodiment.

Referring to FIG. 2, the system for displaying 3D augmented reality may include, for example, the terminal 100 and the server 200 accessing the network Net.

The terminal 100 may include a processor 110, a memory 120, a communication module 130, a bus 140, an input/output device 150, a camera 160, and a sensor 170. According to another embodiment, the terminal 100 may not include the sensor 170.

The processor 110 may perform basic arithmetic, logic, and input/output operations and execute a program code stored in the memory 120.

The memory 120 is a recording medium readable by the processor 110 of the terminal 100, and may include random access memory (RAM), read-only memory (ROM), and a permanent mass storage device such as a disk drive. The memory 120 may store an operating system and at least one program or application code. The memory 120 may store a program code capable of displaying 3D augmented reality according to various embodiments.

The communication module 130 may access the network Net to exchange data with the server 200. For example, the processor 110 of the terminal 100 may transmit, to the server 200, the image data obtained by photographing the target object and receive, from the server 200, the relative pose data of the target object, using the communication module 130, according to the program code stored in the memory 120.

The bus 140 may provide a path for exchanging data between at least some of the processor 110, memory 120, communication module 130, input/output device 150, camera 160, and sensor 170 of the terminal 100.

The input/output device 150 may receive an input from the user and transmit the same to the processor 110, and output information received from the processor 110 to the user. For example, an input device of the input/output device 150 may include the camera 160. In addition, the input/output device 150 may include, as an input device, a touch screen, a microphone, a button, a keyboard, or a mouse. The input/output device 150 may include, as an output device, an image display device such as a display, or a voice output device such as a speaker or an earphone.

The user may select the virtual object to be displayed in augmented reality, via the input device. The user may select a target object to be augmented with the 3D image of the virtual object, from among target objects in the image, via the input device.

The terminal 100 may include a display device for displaying the augmented image generated according to embodiments of the present disclosure. According to another embodiment, augmented image data may be transmitted to a separate display device connected via the network Net, and the separate display device may display the augmented image.

The camera 160 may generate an image of the target object by photographing the target object. The camera 160 may provide the image of the target object to the processor 110 via the bus 140, and the processor 110 may transmit the image of the target object to the server 200 via the communication module 130.

The sensor 170 may include an inertial sensor and may detect information about the direction, speed, acceleration, or the like of the camera 160 or the terminal 100. For example, the sensor 170 may include a 3-axis acceleration sensor or 3-axis gyro sensor. The terminal 100 may use a sensor value of the sensor 170 to detect the motion and rotation of the camera 160 or the terminal 100.

The terminal 100 may further include components other than those shown in FIG. 2. For example, the terminal 100 may include a position detection module. The position detection module may be a function block capable of electronically detecting the current position of the terminal 100. The terminal 100 may provide, to the server 200, the current position of the terminal 100 in addition to the image of the target object, thereby limiting a search range for extracting data related to the target object from the image received by the server 200. For example, when the terminal 100 provides, to the server 200, information about being positioned in a clothing store, the server 200 may determine that the target object is related to clothing, and thus further accurately extract the class, position, and relative pose data of the target object.

The server 200 may include a processor 210, a memory 220, a communication module 230, a bus 240, and an input/output interface 250.

The processor 210 may perform basic arithmetic, logic, and input/output operations and may execute a program code stored in the memory 220, for example, a learning model.

The memory 220 is a recording medium readable by the processor 210 of the server 200, and may include RAM, ROM, and a permanent mass storage device such as a disk drive. The memory 220 may store an operating system and at least one program or application code. The memory 220 may store a program code for performing a method of generating the class, position, and relative pose data of the target object from the image of the target object, by using the learning model. Also, the memory 220 may store a program code for training the learning model by using the image data and relative pose data of the target object, which are received from the terminal 100.

The communication module 230 may access the network Net wirelessly to receive data from the terminal 100 and transmit data to the terminal 100. For example, the communication module 230 may receive the image of the target object from the terminal 100, and transmit, to the terminal 100, data, such as the relative pose data of the target object, extracted by the processor 110 of the server 200.

The bus 240 may provide a path for exchanging data between at least some of the processor 210, the memory 220, the communication module 230, and the input/output interface 250. The input/output interface 250 may provide an interface method with an input/output device.

Figure 3:
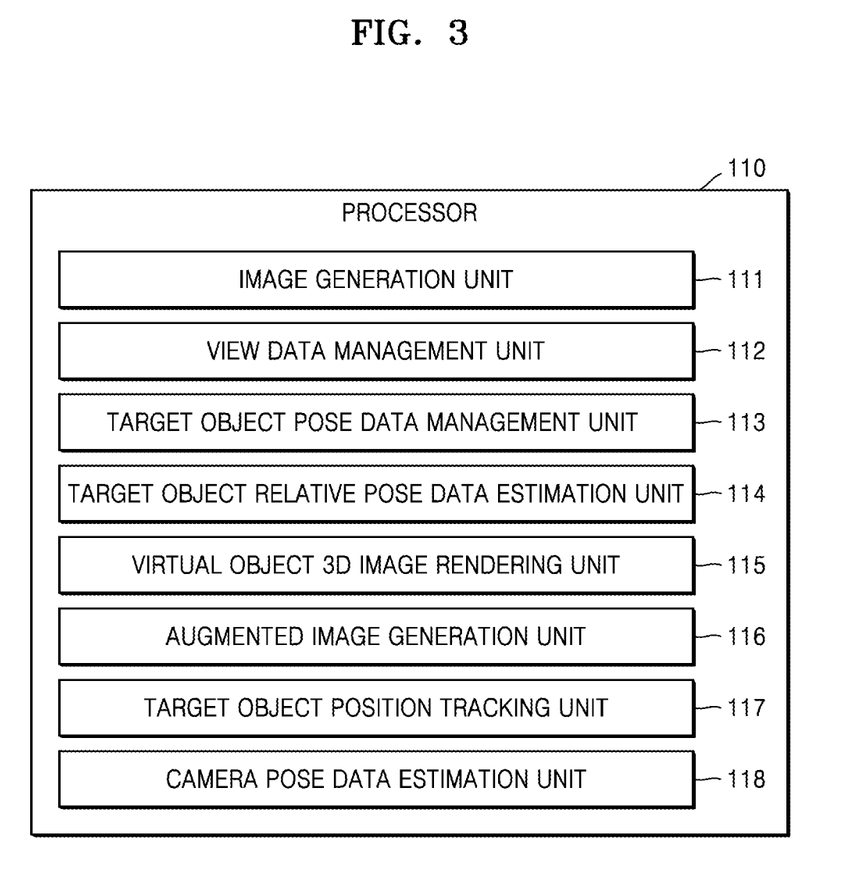
FIG. 3 is a block diagram illustrating the internal configuration of a terminal processor, according to an embodiment.
Figure 4:
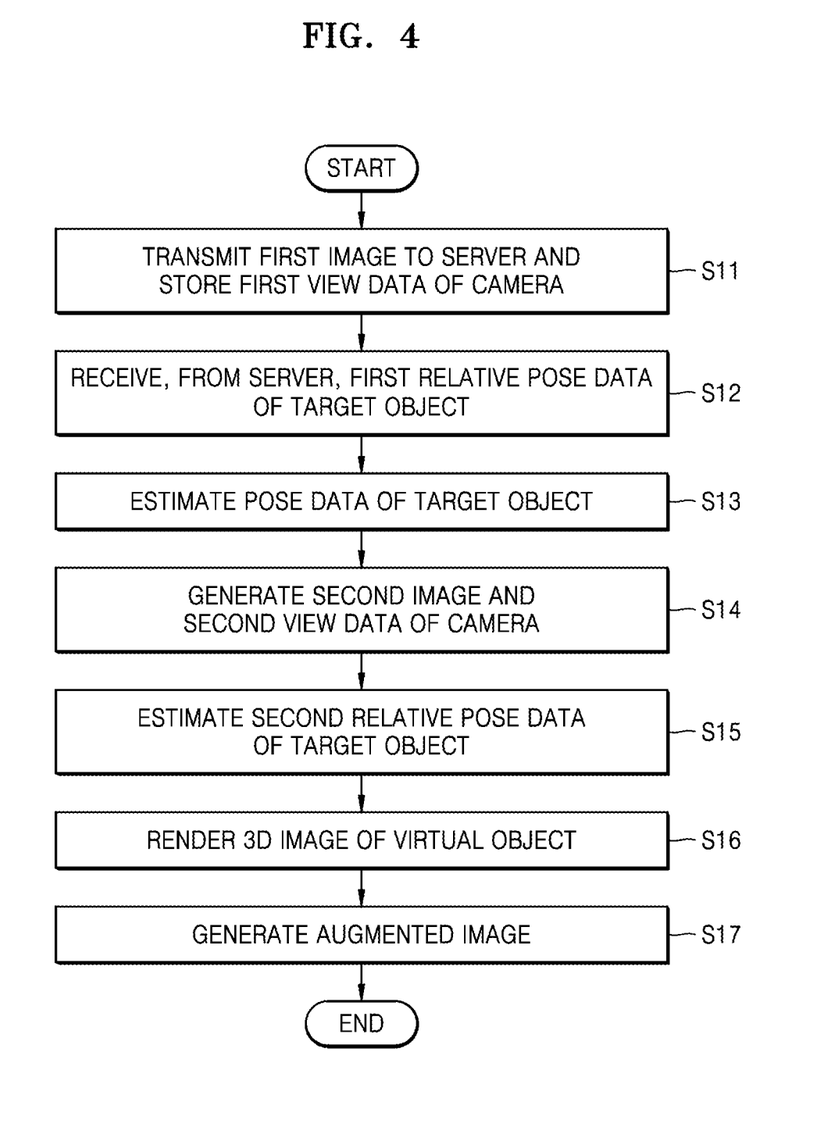
FIG. 4 is a flowchart for describing a method of displaying 3D augmented reality, according to an embodiment.
Figure 5:
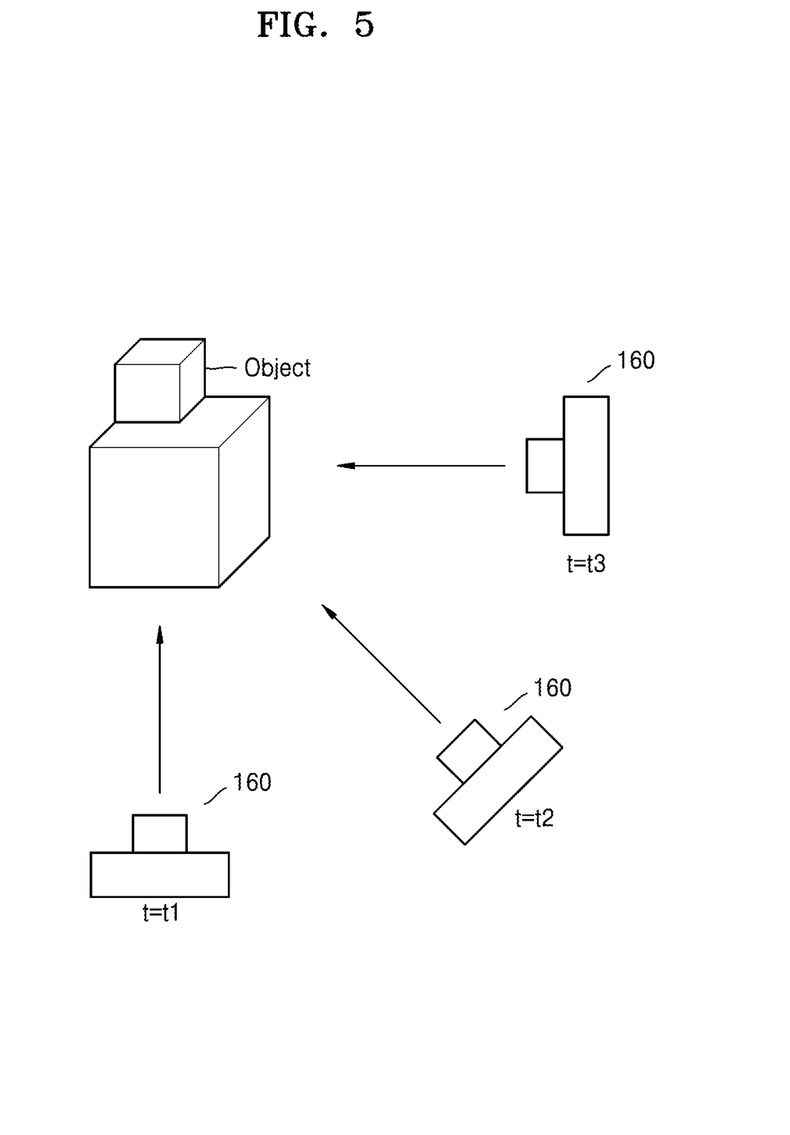
FIG. 5 illustrates a camera photographing a target object while moving and rotating at first to third time points.
Figure 6:
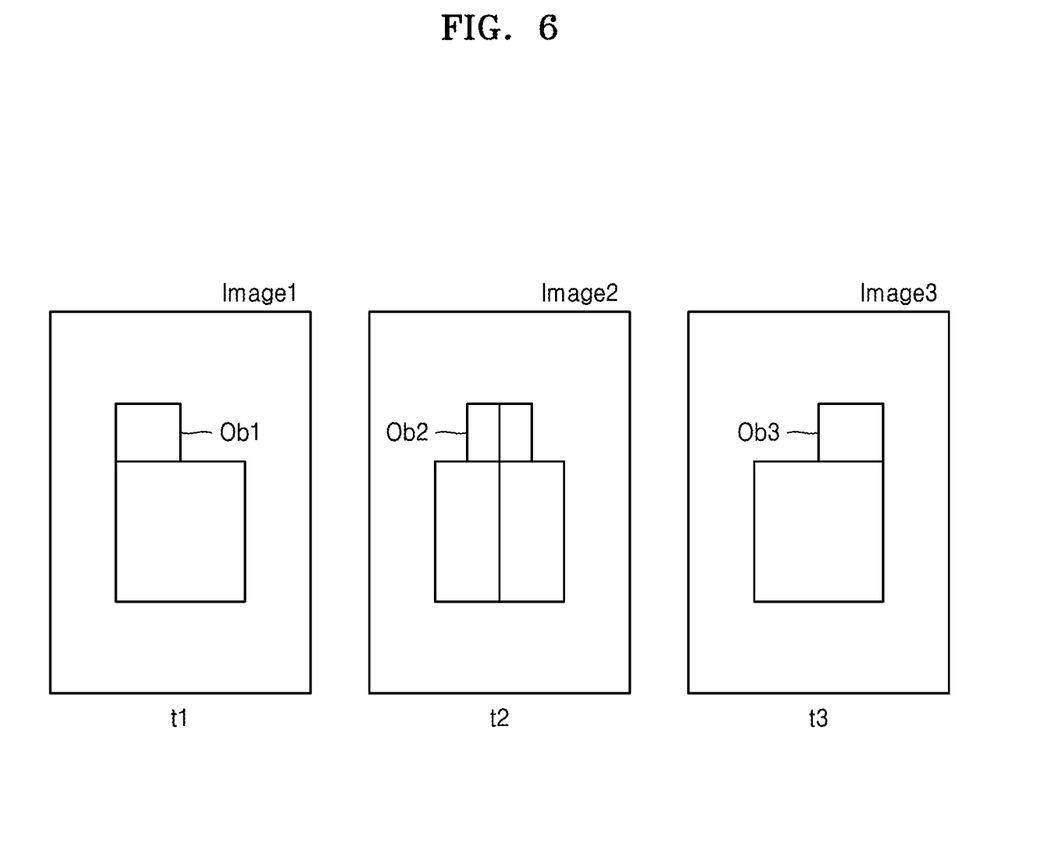
FIG. 6 illustrates first to third images of target objects, which are captured at first to third time points by a camera.
Figure 7:
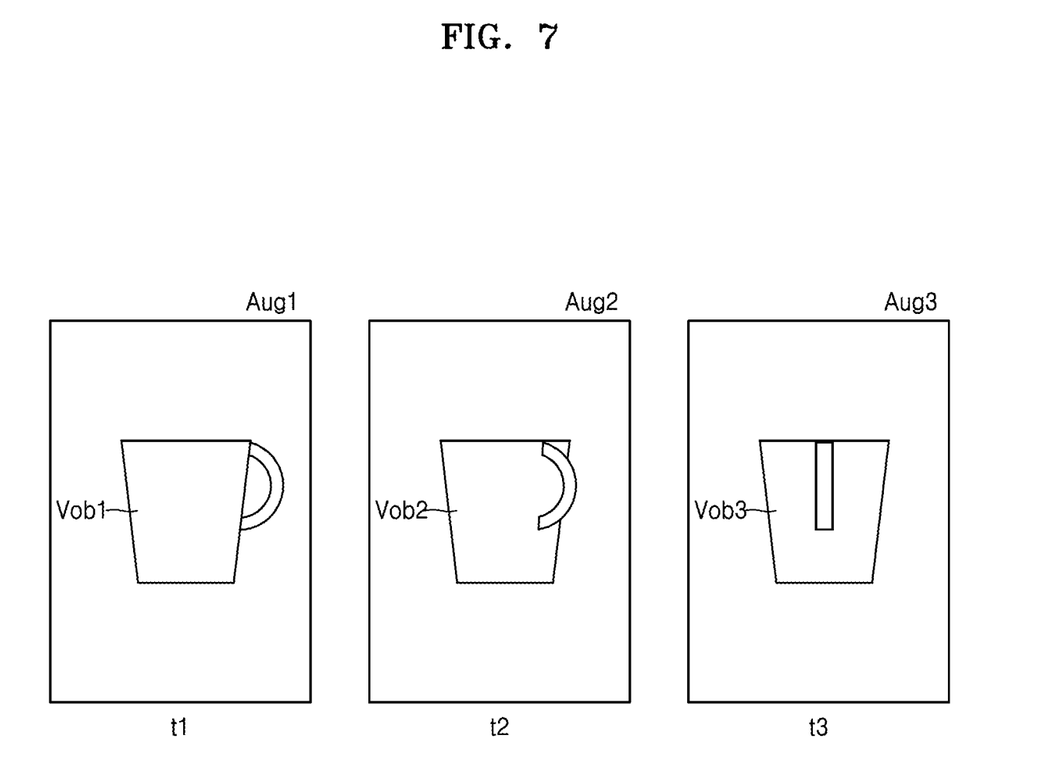
FIG. 7 illustrates virtual images of virtual objects, which are generated according to a method of displaying 3D augmented reality, according to an embodiment.

FIG. 3 illustrates an internal configuration of a terminal processor, according to an embodiment. FIG. 4 is a flowchart for describing a method of displaying 3D augmented reality, according to an embodiment. FIGS. 5 to 7 are diagrams for describing the method of displaying 3D augmented reality, according to an embodiment. FIG. 5 illustrates the camera 160 photographing a target object Object while moving and rotating at first to third time points t1 to t3. FIG. 6 illustrates first to third images Image1 to Image3 of target objects Ob1 to Ob3, which are captured at the first to third time points t1 to t3 by the camera 160. FIG. 7 illustrates virtual images Aug1 to Aug3 of virtual objects Vob1 to Vob3, which are generated according to the method of displaying 3D augmented reality, according to an embodiment.

Referring to FIGS. 3 to 7, the processor 110 of the terminal 100 includes an image generation unit 111, a view data management unit 112, a target object pose data management unit 113, a target object relative pose data estimation unit 114, a virtual object 3D image rendering unit 115, and an augmented image generation unit 116. The processor 110 may further include at least one of a target object position tracking unit 117 or a camera pose data estimation unit 118.

The image generation unit 111 may generate the image by capturing the target object by using the camera 160. The camera 160 may be included in the terminal 100. However, this is only an example and the camera 160 may be communicably connected to the terminal 100 to exchange data in real time. Hereinbelow, it is described that the terminal 100 includes the camera 160, but the present disclosure is not limited thereto.

Referring to FIGS. 5 and 6, an image of the target object Object captured at a first time point t1 is referred to as a first image Image1, an image of the target object Object captured at a second time point t2 is referred to as a second image Image2, and an image of the target object Object captured at a third time point t3 is referred to as a third image Image3.

At least one of images generated by the image generation unit 111 may be transmitted to the server 200 via the communication module 130. For example, the first to third images Image1 to Image3 may be transmitted to the server 200. According to another embodiment, some of the first to third images Image1 to Image3 may be transmitted to the server 200. In the present specification, it is assumed that the first image Image1 and third image Image3 are transmitted to the server 200, and the second image Image2 is not transmitted to the server 200.

A time is required for the terminal 100 to receive the relative pose data from the server 200 after transmitting the image to the server 200. During this time as well, the camera 160 or terminal 100 including the camera 160 may move, and the relative pose data of the target object changes according to the motion of the terminal 100. In this case, since the 3D image of the virtual object rendered by the processor 110 is generated based on the previous relative pose data of the target object, there is a sense of difference in the augmented image.

According to the present disclosure, even before the relative pose data is received from the server 200, the terminal 100 estimates the relative pose data of the target object in a new image, based on the relative pose data previously received from the server 200, and renders the 3D image of the virtual object based on such relative pose data of the target object, and thus the sense of difference in the augmented image may be remarkably reduced.

The second time point t2 is after the first time point t1. The third time point t3 may be after the second time point t2. However, this is only an example, and the third time point t3 may be between the first time point t1 and the second time point t2.

The camera 160 or the terminal 100 including the camera 160 may move between the first through third time points t1 through t3. For example, the camera 160 or the terminal 100 including the camera 160 may perform, between the first through third time points t1 through t3, at least one of a translation motion of a first magnitude in a first direction or a rotation motion of a second magnitude in a second direction.

The view data management unit 112 may store and manage view data of the camera 160 at the time point the camera 160 photographs the target object. The view data management unit 112 may store first view data at the first time point t1, store second view data at the second time point t2, and store third view data at the third time point t3. The view data management unit 112 may manage pieces of view data by deleting view data stored before a pre-set time.

The view data of the camera 160 is data directly related to the pose of the camera 160. The view data of the camera 160 may be a view matrix indicating how the real world, i.e., a fixed subject, moves and rotates in the camera coordinate system defined by the pose of the camera 160. In other words, the view data of the camera 160 may denote a matrix for converting coordinate values in the real-world coordinate system into the camera coordinate system, or element values of the matrix.

The pose of the camera 160 and the camera coordinate system defined by the pose of the camera 160 change according to the motion of the camera 160. The view data of the camera 160 varies depending on the motion of the camera 160.

The view data of the camera 160 may have a relationship of an inverse function with pose data of the camera 160. The pose data of the camera 160 may be data indicating the pose of camera in the real-world coordinate system. In other words, the pose data of the camera 160 may denote a matrix for converting coordinate values in the camera coordinate system into the real-world coordinate system, or element values of the matrix.

The processor 110 may calculate the pose data of the camera 160, based on the view data of the camera 160, or calculate the view data of the camera 160, based on the pose data of the camera 160.

In the present specification, the view data and the pose data of the camera 160 may have the above meanings, but according to another embodiment, the pose data may be a view matrix and the view data may be an inverse matrix of the pose data.

The view data management unit 112 may detect the motion of the camera 160 and change or newly generate the view data according to the motion of the camera 160.

According to an embodiment, the view data management unit 112 may detect the motion of the camera 160, based on how feature points of images captured by the camera 160 have moved. For example, the view data management unit 112 may detect how feature points in the first image Image1 and feature points in the second image Image2 have changed with each other, and estimate the direction and the magnitude of the translation motion of the camera 160 and the direction and the magnitude of the rotation motion of the camera 160, based on the detection. According to an embodiment, the view data management unit 112 may generate and manage the view data of the camera 160 by using a visual odometry technology.

According to another embodiment, the view data management unit 112 may generate and manage the view data of the camera 160, based on sensor values of the sensors 170 in the terminal 100. The sensors 170 may be inertial sensors and may output sensor values corresponding to where and how much the terminal 100 has moved and rotated.

According to another embodiment, the view data management unit 112 may generate and manage the view data of the camera 160, based on the changes in the feature points in the images captured by the camera 160 and the sensor values of the sensors 170. For example, the view data management unit 112 may generate and manage the view data of the camera 160 by using a visual inertial odometry technology.

The target object pose data management unit 113 may receive the relative pose data of the target object Object from the server 200, estimate pose data of the target object, based on received relative pose data of the target object and the view data of the camera at the same time point, and store and manage the pose data.

For example, the pose data of the target object Object may be calculated and stored, based on first relative pose data of the target object Object at the first time point t1 from the server 200 and first view data of the camera 160 at the first time point t1. Then, the pose data of the target object Object may be calculated, based on third relative pose data of the target object Object at the third time point t3 from the server 200 and third view data of the camera 160 at the third time point t3.

The pose data (hereinafter, first pose data) of the target object Object calculated for the first time point t1 and the pose data (hereinafter, second pose data) of the target object Object calculated for the third time point t3 theoretically have the same value. However, the first pose data and the second pose data may have an unacceptable error due to the inaccuracy of the learning model of the server 200, inaccuracy of the view data of the camera 160, or the like.

The target object pose data management unit 113 may ignore the second pose data when the error between the first pose data and the second pose data exceeds a reference value. On the other hand, when the error between the first pose data and the second pose data is within the reference value, the target object pose data management unit 113 may update pose data used by the target object relative pose data estimation unit 114, based on the first pose data and the second pose data. For example, the target object pose data management unit 113 may update the pose data of the target object, by using an average or weighted average of the first pose data and the second pose data.

The target object relative pose data estimation unit 114 may estimate the relative pose data of the target object Object, based on the view data of the camera 160 and the pose data of the target object managed by the target object pose data management unit 113.

As another example, the target object relative pose data estimation unit 114 may receive the relative pose data of the target object Object from the server 200, and provide the same to the target object pose data management unit 113.

The virtual object 3D image rendering unit 115 may render the 3D image of the virtual object, based on the relative pose data of the target object Object. The virtual object may be pre-selected by a user of the terminal 100.

The augmented image generation unit 116 may generate an augmented image by adding the 3D image of the virtual object generated by the virtual object 3D image rendering unit 115 to the position of the target object of the image generated by the image generation unit 111.

The target object position tracking unit 117 may track the position of the target object on the images generated by the image generation unit 111 at the first to third time points t1 to t3. For example, upon receiving the first image Image1 at the first time point t1, the server 200 may estimate the class and position of the target object Object in the first image Image1, and provide the same to the terminal 100.

The terminal 100 may determine the position of the target object Object in the second image Image2 by tracking the target object Object, based on the position of the target object Object in the first image Image1. The target object position tracking unit 117 may extract feature points in the first image Image1 and second image Image2 and compare the feature points, thereby tracking where in the second image Image2 the target object in the first image Image1 is positioned.

The camera pose data estimation unit 118 may estimate the pose data of the camera 160, based on the view data of the camera 160. The camera pose data estimation unit 118 may calculate the pose data of the camera 160 by calculating an inverse matrix of the view data of the camera 160.

Hereinafter, for easy understanding the pose data of the target object is represented by Mobjwc. The pose data Mobjwc of the target object may be a matrix for converting coordinate values in the object coordinate system into the real-world coordinate system, or element values of the matrix. The object coordinate system is a coordinate system defined by an object, wherein the object may be located in the origin of the object coordinate system and x, y, and z axes of the object coordinate system may be determined based on a direction appointed by the user with respect to the object.

The view data of the camera 160 is represented by Mv. The first view data is represented by Mv_1, the second view data is represented by Mv_2, and the third view data is represented by Mv_3. The view data Mv of the camera 160 may be a view matrix indicating how a real world, i.e., a fixed subject, moves and rotates in the camera coordinate system defined by the pose of the camera 160.

The relative pose data of the target object is represented by Mobjec. The relative pose data Mobjec may be a matrix for converting coordinate values in the object coordinate system into the camera coordinate system defined by the pose of the camera 160, or element values of the matrix.

The first relative pose data is represented by Mobjec_1, the second relative pose data is represented by Mobjec_1, and the third relative pose data is represented by Mobjec_1.

The pose data of the camera 160 is represented by Mecwc. The pose data Mecwc of the camera 160 is for indicating how the camera has moved and rotated in the real-world coordinate system, and may be a matrix for converting coordinate values in the real-world coordinate system into the camera coordinate system, or element values of the matrix. The pose data of the camera 160 may be represented by Mv-1.

The first pose data of the camera 160 is represented by Mec_1wc, the second pose data of the camera 160 is represented by Mec_2wc, and the third pose data of the camera 160 is represented by Mec_3wc.

The pose data Mobjwc of the target object, the relative pose data Mobjec of the target object, and the view data Mv and pose data Mecwc of the camera 160 may each have a form of a 4×4 pose matrix. The 4×4 pose matrix may include a 3×3 rotation matrix and a 3×1 translation matrix. For example, the 4×4 pose matrix may be defined as [(3×3 translation matrix), (3×1 translation matrix); (0 0 0), 1].

The method of displaying 3D augmented reality, according to an embodiment, will be described with reference to FIGS. 4 through 7.

In operation S11, the processor 110 may generate a first image (the first image Image1 of FIG. 6) by photographing the target object Object by using the camera 160 at the first time point t1, and transmit the first image Image1 to the server 200. Also, the processor 110 may store the first view data Mv_1 of the camera 160 at the first time point t1 when the first image Image1 is generated. The first image Image1 may be generated by the image generation unit 111 and the first view data Mv_1 may be generated by the view data management unit 112 (operation S11).

In FIG. 5, solely for easy understanding, the target object Object is shown, for example, as a structure in which two cubes having different sizes are combined. However, the target object Object may be any object, such as shoes, glasses, electronic products, clothes, or hats sold in stores.

The server 200 needs to include a learning model for recognizing and extracting the target object Object in the first image Image1, and the learning model needs to be pre-trained to recognize and extract the target object Object. In this regard, the terminal 100 may transmit, to the server 200, images obtained by photographing the target object Object in various directions and the relative pose data of the target object Object at this time, and the server 200 may train the learning model based on the images and the relative pose data.

The first view data Mv_1 may be generated first by the view data management unit 112. The view data management unit 112 may generate the first view data Mv_1 based on the first image Image1 or at least one of sensor values of the inertial sensors 170.

The first view data Mv_1 may be indicated by a first view matrix Mwcec_1, and the first view matrix Mwcec_1 may be represented by a matrix for converting coordinate values in the real-world coordinate system into a first camera coordinate system defined by the pose of the camera 160 at the first time point t1, or element values of the matrix.

In operation S12, the processor 110 may receive, from the server 200, first relative pose data Mobjec_1 of the target object Object. The server 200 may be configured to output the first relative pose data Mobjec_1 of the target object Object from the first image Image1 by using the pre-trained learning model. As another example, the server 200 may be configured to output, from the first image Image1, the class of the target object Object and the position of the target object Object in the first image Image1, by using the pre-trained learning model.

The first relative pose data Mobjec_1 may be indicated by a matrix for converting coordinate values in the object coordinate system into the first camera coordinate system defined by the pose of the camera 160 at the first time point t1, or element values of the matrix.

The first relative pose data Mobjec_1 of the target object Object may be received by the target object pose data management unit 113 or the target object relative pose data estimation unit 114.

In operation S13, the processor 110 may estimate the pose data Mobjwc of the target object Object, based on the first view data Mv_1 of the camera 160 and the first relative pose data Mobjec_1 of the target object Object. The pose data Mobjwc of the target object Object may be estimated by the target object pose data management unit 113.

The pose data Mobjwc of the target object Object may indicate the pose of the target object Object in the real-world coordinate system, and may be indicated by a matrix for converting coordinate values in the object coordinate system into the real-world coordinate system, or element values of the matrix.

Before the target object pose data management unit 113 estimates the pose data Mobjwc of the target object Object, the camera pose data estimation unit 118 may generate, based on the first view data Mv_1 of the camera 160, the first pose data Mec_1wc of the camera 160 indicating the pose of the camera 160 at the first time point t1 in the real-world coordinate system. The camera pose data estimation unit 118 may calculate the first pose data Mec_1wc of the camera 160 by calculating an inverse matrix of the first view data Mv_1 of the camera 160.

In FIG. 3, the camera pose data estimation unit 118 and the target object pose data management unit 113 are illustrated to be separate configurations, but the camera pose data estimation unit 118 may be a partial functional block in the target object pose data management unit 113.

The target object pose data management unit 113 may calculate the pose data Mobjwc of the target object Object by multiplying the first pose data Mec_1wc of the camera 160 generated based on the first view data Mv_1 of the camera 160 by the first relative pose data Mobjec_1 of the target object Object.

In operation S14, the image generation unit 111 may generate a second image (the second image Image2 of FIG. 6) by photographing the target object Object by using the camera 160 at the second time point t2, and the view data management unit 112 may generate the second view data Mv_2 of the camera 160 at the second time point t2. Operation S14 is illustrated to be after operations S12 and S13, but this is solely for easy understanding, and operation S14 may be performed between operations S11 and S12 or between operations S12 and S13.

As shown in FIG. 5, the camera 160 moves between the first time point t1 and the second time point t2. The second view data Mv_2 of the camera 160 may become different from the first view data Mv_1 of the camera 160, in response to the motion of the camera 160.

According to an embodiment, the view data management unit 112 may estimate the direction and the magnitude of the translation motion and the direction and the magnitude of the rotation motion, in response to the motion of the camera 160 between the first time point t1 and the second time point t2. The view data management unit 112 may generate the second view data Mv_2 of the camera 160, based on the first view data Mv_1 of the camera 160, the direction and the magnitude of the translation motion, and the direction and the magnitude of the rotation motion.

The second view data Mv_2 may be indicated by a second view matrix Mwcec_2, and the second view matrix Mwcec_2 may be represented by a matrix for converting coordinate values in the real-world coordinate system into a second camera coordinate system defined by the pose of the camera 160 at the second time point t2, or element values of the matrix.

According to an embodiment, the view data management unit 112 may extract first feature points from the first image Image1, extract second feature points from the second image Image2, and estimate the direction and the magnitude of the translation motion and the direction and the magnitude of the rotation motion, based on a change between the first feature points and the second feature points. In other words, the view data management unit 112 may estimate the direction and the magnitude of the motion of the camera 160, based on the images.

According to another embodiment, the view data management unit 112 may estimate the direction and the magnitude of the motion of the camera 160 by using the sensor values of the inertial sensors 170.

According to another embodiment, the view data management unit 112 may estimate the direction and the magnitude of the translation motion and the direction and the magnitude of the rotation motion, based on the sensor values of the inertial sensors 170, and the change between the first feature points and the second feature points. In other words, the view data management unit 112 may estimate the direction and the magnitude of the motion of the camera 160, based on the images and sensors.

In operation S15, the processor 110 may estimate second relative pose data Mobjec_2 of the target object Object, based on the pose data Mobjwc of the target object Object and the second view data Mv_2 of the camera 160.

The second relative pose data Mobjec_2 may be indicated by a matrix for converting coordinate values in the object coordinate system into the second camera coordinate system defined by the pose of the camera 160 at the second time point t2, or element values of the matrix.

The first relative pose data Mobjec_1 of the target object Object indicates the pose of the target object Object in the first camera coordinate system, and the second relative pose data Mobjec_2 of the target object Object indicates the pose of the target object Object in the second camera coordinate system.

The target object relative pose data estimation unit 114 may estimate the second relative pose data Mobjec_2 of the target object Object by multiplying the second view data Mv_2 by the pose data Mobjwc of the target object Object.

In operation S16, the processor 110, in particular, the virtual object 3D image rendering unit 115, may render a 3D image (a 3D image Vob2 of FIG. 7) of a virtual object, based on the second relative pose data Mobjec_2 of the target object Object.

Before operation S16, the processor 110 may receive, from the user, a signal of selecting the virtual object. Solely for easy understanding, it is assumed that the virtual object is a cup in FIG. 7. The processor 110 may receive, from the server 200 or another server, a program code for rendering the 3D image of the virtual object.

Referring to the second image Image2 of FIG. 6 captured at the second time point t2 and a second augmented image Aug2 of FIG. 7, a pose of the target object Ob2 and a pose of the virtual object shown in the 3D image Vob2 of the virtual object are the same. It is assumed that the front of the target object Ob1 is shown in the first image Image1 of FIG. 6, and the front of the virtual object is shown in a 3D image Vob1 of FIG. 7.

In operation S17, the processor 110, in particular, the augmented image generation unit 116, may generate the second augmented image Aug2 of FIG. 7 by augmenting the 3D image Vob2 of FIG. 7 of the virtual object on the second image Image2 of FIG. 6. The processor 110 may display the second augmented image Aug2 on the input/output device 150, in particular, a display device.

In operation S12, the server 200 may generate, from the first image Image1, the class of the target object Object and the position of the target object Object in the first image Image1, by using the pre-trained learning model, and transmit the same to the processor 110. The processor 110 may receive the class of the target object Object in the first image Image1, and a first position of the target object Object in the first image Image1.

In operation S17, the target object position tracking unit 117 may determine a second position of the target object Object in the second image Image2 by tracking the target object Object in the first image Image1, based on the first position of the target object Object in the first image Image1. The augmented image generation unit 116 may generate the second augmented image Aug2 shown in FIG. 7 by adding the 3D image Vob2 of the virtual object at the second position of the target object Object in the second image Image2.

The augmented image generation unit 116 may track the target object Object by tracking movements and changes of feature points in the first image Image1 and second image Image2.

According to the current embodiment, in operation S12, the processor 110 receives the first relative pose data Mobjec_1 of the target object Object from the server 200, but in operation S15, the processor 110 directly estimates the second relative pose data Mobjec_2 of the target object Object.

A time is required for the processor 110 to receive the first relative pose data Mobjec_1 of the target object Object from the server 200 after transmitting the first image Image1 to the server 200. During this time, the terminal 100 and the camera 160 may move or rotate. In other words, the pose of the camera 160 changes, and thus the relative pose data Mobjec of the target object Object also changes. Accordingly, when the 3D image of the virtual object is rendered based on the first relative pose data Mobjec_1 of the target object Object from the server 200 at the second time point t2, an augmented image Aug1 of FIG. 7 is generated at the second time point t2, and thus a relative pose of the target object Object and a relative pose of the virtual object are different from each other, thereby causing a sense of difference.

According to the present disclosure, the processor 110 may detect, in real time, the view data My or pose data Mecwc of the camera 160 in response to the motion of the terminal 100 or camera 160, and self-estimate the second relative pose data Mobjec_2 of the target object Object at the second time point t2 based on the view data My or pose data Mecwc. Accordingly, when the 3D image of the virtual object is rendered based on the second relative pose data Mobjec_2 of the target object Object self-estimated at the second time point t2, the second augmented image Aug2 of FIG. 7 is generated at the second time point t2, and thus the relative pose of the target object Object and the relative pose of the virtual object are same, thereby noticeably reducing a sense of difference.

Then, operations S14 to S17 are repeated to generate augmented images corresponding to the motion of the camera 160. However, an error of the relative pose data Mobjec of the target object Object estimated in operation S15 may be accumulated. In this regard, the processor 110 may intermittently receive the relative pose data Mobjec of the target object Object from the server 200, and compensate for the accumulated error based on the relative pose data Mobjec received from the server 200. According to an embodiment, the processor 110 may further perform compensating for the pose data Mobjwc of the target object Object, based on the relative pose data Mobjec of the target object Object received from the server 200.

To describe the compensating for the accumulated error of the relative pose data Mobjec, the pose data Mobjwc of the target object Object estimated in operation S13 is referred to as first pose data Mobjwc_1 of the target object Object.

As in operation S11, the processor 110 may transmit, to the server 200, the third image Image3 of FIG. 6 generated by photographing the target object Object by using the camera 160 at the third time point t3, and store the third view data Mv_3 of the camera 160 at this time.

As inn operation S12, the processor 110 may receive, from the server 200, third relative pose data Mobjec_3 of the target object Object.

As in operation S13, the processor 110 may calculate the second pose data Mobjwc_2 of the target object Object, based on the third view data Mv_3 of the camera 160 and the third relative pose data Mobjec_3 of the target object Object.

The processor 110 may determine whether the second pose data Mobjwc_2 of the target object Object is within a normal range set based on the pose data Mobjwc of the target object Object or the previously generated first pose data Mobjwc_1 of the target object Object.

When it is determined that the second pose data Mobjwc_2 of the target object Object is within the normal range, the processor 110 may update the pose data Mobjwc of the target object Object, based on the first pose data Mobjwc_1 of the target object Object and the second pose data Mobjwc_2 of the target object Object. For example, the pose data Mobjwc of the target object Object may be an average or weighted average of the first pose data Mobjwc_1 of the target object Object and the second pose data Mobjwc_2 of the target object Object. For example, the pose data Mobjwc of the target object Object may be updated to a value calculated based on pieces of the pose data Mobjwc of the target object Object, which are calculated during a pre-set period and determined to be within the normal range.

Also, at this time, the processor 110 may render a 3D image Vob3 of the virtual object, based on the third relative pose data Mobjec_3 of the target object Object. The 3D image Vob3 at this time is referred to as a second 3D image. The processor 110 may generate an augmented image Aug3 by augmenting the 3D image Vob3 of the virtual object on the third image Image3.

However, when it is determined that the second pose data Mobjwc_2 of the target object Object is not within the normal range, the processor 110 may maintain the pose data Mobjwc of the target object Object and estimate the third relative pose data Mobjec_3 of the target object Object, based on the pose data Mobjwc of the target object Object and the third view data Mv_3 of the camera 160 as in operation S15. As in operation S16, the processor 110 may render the 3D image Vob3 of the virtual object, based on the third relative pose data Mobjec_3 of the target object Object estimated in the previous operation. The 3D image Vob3 at this time is referred to as a third 3D image. The third relative pose data Mobjec_3 of the target object Object received from the server 200 and the third relative pose data Mobjec_3 of the target object Object self-estimated by the processor 110 may be different from each other, and thus the second 3D image and the third 3D image may be different from each other.

The processor 110 may generate the augmented image Aug3 by augmenting the 3D image Vob3 of the virtual object on the third image Image3.

Various embodiments described above are exemplary and are not necessarily distinguished and independently implemented. The embodiments described in the present specification may be implemented in combination with each other.

The various embodiments described above may be implemented in a form of a computer program executable by various components on a computer, and such a computer program may be recorded in a computer-readable medium. Here, the medium may continuously store computer-executable programs, or temporarily store the computer-executable programs or instructions for execution or downloading. Also, the medium may be any one of various recording media or storage media in which a single piece or plurality of pieces of hardware are combined, and the medium is not limited to a medium directly connected to a computer system, but may be distributed on a network. Examples of the medium include magnetic media, such as a hard disk, a floppy disk, and a magnetic tape, optical recording media, such as CD-ROM and DVD, magneto-optical media such as a floptical disk, and ROM, RAM, and a flash memory, which are configured to store program instructions. Other examples of the medium include recording media and storage media managed by application stores distributing applications or by websites, servers, and the like supplying or distributing other various types of software.

In the specification, the term "unit" or "module" may be a hardware component such as a processor or circuit and/or a software component that is executed by a hardware component such as a processor. For example, the "unit" or "module" may be implemented by software components, object-oriented software components, class components, and task components, and may include processes, functions, attributes, procedures, subroutines, segments of program code, drivers, firmware, micro codes, circuits, data, a database, data structures, tables, arrays, or variables.

The above description of the present disclosure is provided for illustration, and it will be understood by one of ordinary skill in the art that various changes in form and details may be readily made therein without departing from essential features and the scope of the present disclosure as defined by the following claims. Accordingly, the embodiments described above are examples in all aspects and are not limited. For example, each component described as a single type may be implemented in a distributed manner, and similarly, components described as distributed may be implemented in a combined form.

The scope of the present disclosure is defined by the appended claims, and all changes or modifications within the scope of the appended claims and their equivalents will be construed as being included in the scope of the present disclosure.

The invention claimed is:

1. A method, performed by a computing device communicating with a server, of displaying 3-dimensional (3D) augmented reality, the method comprising:
   transmitting, to the server, a first image generated by photographing a target object by using a camera at a first time point, and storing first view data of the camera at the first time point;
   receiving, from the server, first relative pose data of the target object;
   estimating first pose data of the target object, based on the first view data of the camera and the first relative pose data of the target object;
   generating a second image by photographing the target object by using the camera at a second time point, and generating second view data of the camera at the second time point;
   estimating second relative pose data of the target object, based on the first pose data of the target object and the second view data of the camera;
   rendering a first 3D image of a virtual object, based on the second relative pose data of the target object; and
   generating a first augmented image by augmenting the first 3D image of the virtual object on the second image.

2. The method of claim 1, wherein the receiving of the first relative pose data of the target object comprises receiving, from the server, a first position of the target object in the first image, and
   the generating of the first augmented image comprises:
   determining a second position of the target object in the second image, by tracking the target object in the first image, based on the first position of the target object; and adding the first 3D image of the virtual object to the second position of the target object in the second image.

3. The method of claim 1, wherein the generating of the second view data of the camera comprises:
  estimating a direction and a magnitude of a translation motion and a direction and a magnitude of a rotation motion, in response to a motion of the camera between the first point and the second point; and
  generating the second view data of the camera, based on the first view data of the camera, the direction and the magnitude of the translation motion, and the direction and the magnitude of the rotation motion.

4. The method of claim 3, wherein the direction and the magnitude of the translation motion, and the direction and the magnitude of the rotation motion are estimated based on a change between feature points of the first image and feature points of the second image.

5. The method of claim 3, wherein the direction and the magnitude of the translation motion, and the direction and the magnitude of the rotation motion are estimated based on a change between feature points of the first image and feature points of the second image and a sensor value of an inertial sensor in the camera.

6. The method of claim 1, wherein the first pose data of the target object is a matrix for converting a coordinate value in an object coordinate system defined based on the target object into a real-world coordinate system.

7. The method of claim 6, wherein the first view data of the camera is a matrix for converting a coordinate value in the real-world coordinate system into a first camera coordinate system defined by a pose of the camera at the first time point, and
  the second view data of the camera is a matrix for converting a coordinate value in the real-world coordinate system into a second camera coordinate system defined by a pose of the camera at the second time point.

8. The method of claim 7, wherein the first relative pose data of the target object is a matrix for converting a coordinate value in the object coordinate system into the first camera coordinate system, and
  the second relative pose data of the target object is a matrix for converting a coordinate value in the object coordinate system into the second camera coordinate system.

9. The method of claim 8, wherein the estimating of the first pose data of the target object comprises:
  generating first pose data of the camera indicating the pose of the camera at the first time point in the real-world coordinate system, based on the first view data of the camera; and
  multiplying the first pose data of the camera by the first relative pose data of the target object.

10. The method of claim 8, wherein the second relative pose data of the target object is calculated by multiplying the second view data of the camera by the first pose data of the target object.

11. The method of claim 1, further comprising: transmitting, to the server, a third image generated by photographing the target object by using a camera at a third time point, and storing third view data of the camera at the third time point; receiving, from the server, third relative pose data of the target object; calculating second pose data of the target object, based on the third view data of the camera and the third relative pose data of the target object; determining whether the second pose data of the target object is within a normal range set based on the first pose data of the target object; and when it is determined that the second pose data of the target object is within the normal range, updating the first pose data of the target object based on the first pose data of the target object and the second pose data of the target object.

12. The method of claim 11, further comprising, when it is determined that the second pose data of the target object is within the normal range:
  rendering a second 3D image of the virtual object, based on the third relative pose data of the target object; and
  generating a second augmented image by augmenting the second 3D image of the virtual object on the third image.

13. The method of claim 11, further comprising, when it is determined that the second pose data of the target object is not within the normal range:
  maintaining the first pose data of the target object;
  estimating third relative pose data of the target object, based on the first pose data of the target object and the third view data of the camera;
  rendering a third 3D image of the virtual object, based on the estimated third relative pose data of the target object; and
  generating a third augmented image by augmenting the third 3D image of the virtual object on the third image.

14. The method of claim 1, wherein the first view data of the camera, the first relative pose data of the target object, and the first pose data of the target object each have a form of a 4×4 pose matrix including a 3×3 rotation matrix and a 3×1 translation matrix.

15. The method of claim 1, further comprising displaying the first augmented image on a display.

16. The method of claim 1, wherein the server is configured to output, from the first image, a class of the target object, a position of the target object in the first image, and the first relative pose data by using a pre-trained learning model.

17. A non-transitory computer readable recording medium storing a computer program for executing the method of claim 1.

* * * * *